(12) United States Patent
Gast-Bray (10) Patent No.: US 6,383,568 B1
(45) Date of Patent: May 7, 2002

(54) APPARATUS AND METHODS FOR APPLYING A COATING MATERIAL TO SHEET MATERIAL

(76) Inventor: Andrew L. Gast-Bray, 14 N. Walnut St., Philippi, WV (US) 26416

( * ) Notice: Subject to any disclaimer, the term of this patent is extended or adjusted under 35 U.S.C. 154(b) by 0 days.

(21) Appl. No.: 09/640,613

(22) Filed: Aug. 17, 2000

Related U.S. Application Data (60) Provisional application No. 60/150,377, filed on Aug. 23, 1999.

(51) Int. Cl.⁷ ............................. B05D 3/04; B05C 11/06
(52) U.S. Cl. ....................... 427/345; 427/348; 427/349; 118/63; 118/68
(58) Field of Search .................................. 427/348, 349, 427/345, 177; 118/63, 68

(56) References Cited

U.S. PATENT DOCUMENTS

| | | | |
|---|---|---|---|
| 2,160,396 A | | 5/1939 | Asbury et al. |
| 2,940,418 A | | 6/1960 | Penrod et al. |
| 2,972,453 A | | 2/1961 | McIlvried |
| 3,069,285 A | | 12/1962 | Viscardi |
| 3,155,530 A | | 11/1964 | Schnedler |
| 3,267,902 A | | 8/1966 | Pritchard et al. |
| 3,291,415 A | | 12/1966 | Bursk |
| 3,343,977 A | * | 9/1967 | Gjesdal |
| 3,529,992 A | | 9/1970 | Sinclair |
| 3,635,193 A | * | 1/1972 | Stease ......................... 118/63 |
| 4,266,504 A | | 5/1981 | Roesner |
| 4,365,583 A | * | 12/1982 | Hisashi et al. ................ 118/65 |
| 4,520,755 A | | 6/1985 | Inukai et al. |
| 5,047,262 A | | 9/1991 | Devries et al. |

FOREIGN PATENT DOCUMENTS

DE 915667 7/1949

OTHER PUBLICATIONS

Copy of July 12, 2001 Written Opinion issued in connection with foreign counterpart application.

* cited by examiner

*Primary Examiner*—Katherine A. Bareford
(74) *Attorney, Agent, or Firm*—Kirkpatrick & Lockhart LLP (57) ABSTRACT

Apparatus and methods for applying a first material to a moving second material that has at least two edges. The apparatus may include at least one supporter for supporting the second material in a substantially non-horizontal orientation and at least one applicator for applying the first material to the second material adjacent to one edge of the second material such that the first material substantially migrates across the second material towards the other edge thereof as the second material moves in a predetermined direction. The apparatus may include apparatus for dispersing the first material on the second material such that the first material that remains on the second material is substantially uniformly distributed thereon. The apparatus may also include interchangeable reservoirs for containing the first material.

24 Claims, 8 Drawing Sheets

APPARATUS AND METHODS FOR APPLYING A COATING MATERIAL TO SHEET MATERIAL

CROSS-REFERENCE TO RELATED APPLICATIONS

This non-provisional application for patent claims priority from U.S. application Ser. No. 60/150,377 filed Aug. 23, 1999.

FEDERALLY SPONSORED RESEARCH

Not applicable.

BACKGROUND OF THE INVENTION

1. Field of the Invention

The subject invention relates to coating apparatuses and methods of coating and, more particularly, to apparatuses and methods for applying a coating material to sheet-like materials in a cascading fashion.

DESCRIPTION OF THE INVENTION BACKGROUND

Over the years, a variety of different apparatuses and methods have been developed for applying coating materials, paint, cleaning solutions, etc. to sheet materials. U.S. Pat. No. 3,069,285 to Viscardi and U.S. Pat. No. 3,529,992 to Sinclair disclose various apparatuses and methods for applying color mediums to sheet-like materials. U.S. Pat. No. 3,155,530 discloses apparatus and methods for coating a strip of steel by passing the strip through a coating pot that contains a coating material.

Still other methods and apparatuses have evolved for applying coating or cleaning materials to continuous strip materials. A common theme generally employed in such methods is that the strip material is supported horizontally, such that the plane of the top surface of the strip is oriented parallel to the horizon, and the coating is applied to the top surface by spraying, applicator rolls, etc. Or, the horizontally-oriented strip may be dipped and moved vertically upward from the plane of the horizon. In those applications wherein a liquid coating material is employed, squeegee rollers and/or wipers may be employed to remove excess coating from the sheet material. If such squeegees and/or wipers inadvertently become contaminated during the coating process, such contamination can be transferred to the coated surface and result in imperfections in the coating. In addition, such devices must typically be precisely adjusted to avoid unacceptable non-uniformities in the coating.

Another method that has been employed to remove excess coating material from sheet material involves the use of air knives that blow a stream of air onto the coated sheet material as it passes thereunder. The stream of air blows the excess material in a predetermined direction until it is blown off of the strip. In applications wherein the strip is supported horizontally, the air knives blow the excess coating material back onto the excess coating material that remains on the strip. Such arrangement tends to increase the overall resistance between the excess material and the strip that can lead to undesirable non-uniform coating thickness. Moreover, because the strip is oriented horizontally, it is more susceptible to collecting dirt, dust and debris which can lead to undesirable coating imperfections. Those of ordinary skill in the art will of course appreciate that the above-mentioned problems are often encountered in all types of applications wherein a material is applied to a horizontally oriented strip of material regardless of whether the applied material is a cleaning solvent, paint, powdered coating material, metallic coating material, etc.

Thus, there is a need for a apparatuses and methods for applying a coating material, solvent, paint, cleaning material etc. to a sheet-like material that does not have the shortcomings of prior coating methods.

There is a further need for an apparatus that can apply a coating material to a sheet-like material in a more efficient manner.

There is still another need for an apparatus for applying a coating material to a sheet-like material that does not encounter the dirt and debris problems often encountered with prior coating methods.

Another need exists for a coating system for sheet-like material wherein excess coating material can be reapplied to the sheet-like material.

Yet another need exists for a coating system wherein different types of coatings can be easily applied to the sheet-like material.

Another need exists for a method for applying a coating material to a continuously moving strip of material having planar surfaces without the need to support the planar surfaces as the coating material is applied thereto.

There is a further need for a coating process that has the above-mentioned attributes that can be used to apply a variety of different heated coatings to a strip of material.

Another need exists for an apparatus for applying a coating material to a strip of steel that requires minimal downtime to change between different types of coating materials.

SUMMARY OF THE INVENTION

In accordance with a particularly preferred form of the present invention, there is provided an apparatus for applying a first material to a moving second material that has at least two edges. In a preferred form, the apparatus includes at least one supporter for supporting the second material in a substantially non-horizontal orientation. The apparatus also includes at least one applicator for applying the first material to the second material adjacent to one edge of the second material such that the first material substantially migrates across the second material towards the other edge thereof as the second material moves in a predetermined direction.

Another embodiment of the present invention comprises an apparatus for applying a liquid coating material to a moving sheet material that has a first edge surface and a second edge surface. The apparatus preferably comprises at least one support member that contacts at least portions of the first edge surface of the moving sheet material and supports the moving sheet material in a non-horizontal orientation. The apparatus also includes at least one coating applicator for applying the coating material adjacent at least a portion of the second edge of the moving sheet material such that the coating material substantially migrates across the sheet material towards the first edge thereof at least under some gravitational influence.

Another embodiment of the present invention includes apparatus for applying a first material to coiled strip material. The apparatus includes a decoiler for supporting the coil of strip material and unwinding the strip material therefrom. The apparatus also includes a coiler for rewinding the strip material into another coil. In addition, the apparatus includes a coating chamber for substantially surrounding at least a portion of the strip material as it passes in a non-horizontal orientation from the decoiler to the coiler and at least one applicator oriented within the coating chamber to apply the material to the strip material adjacent to one edge of the strip material as it passes through the coating chamber. The apparatus may also include at least one wiper assembly for dispersing the material on the strip material as it passes through the coating chamber and an exhaust attached to the coating chamber for removing vapor therefrom.

The present invention may also comprise a method for applying a first material to a second material that has at least two edges. In a preferred form, the method comprises supporting the second material on one edge thereof in a non-horizontal orientation and applying the first material to the second material adjacent another edge of the second material such that at least some of the first material migrates toward the supported edge of the second material under a gravitational influence.

Another embodiment of the present invention comprises a method for applying a material to coiled strip material. The method may include unwinding the coiled strip material and supporting the unwound strip material on one edge thereof in a non-horizontal orientation. In addition, the method includes driving the supported unwound strip material in a predetermined direction while it is in the non-horizontal orientation. The method may also include applying the material to the driven strip material adjacent another edge thereof such that the applied material migrates across said strip material towards the supported edge thereof at least partially under a gravitational influence and rewinding the strip material into another coil after the first material has been applied thereto.

It is a feature of the present invention to provide an apparatus and method for applying a coating material such as molten zinc and other materials to a strip of annealed steel that results in a more efficient application of the zinc on the steel.

It is another feature of the present invention to provide an apparatus and method with the above-mentioned attributes that also results in increased versatility in the range of the thickness of coating that may be applied to the steel.

It is another feature of the present invention to provide apparatus and methods with the above-mentioned attributes that also facilies reduced downtime associated with changing between coatings.

Still another feature of the present invention is to provide steel trip treatment apparatuses and methods with the above-mentioned attributes that can employ small coating reservoirs, which lead to reduced system manufacturing and operating costs.

Another feature of the present invention is to provide apparatuses and methods for applying a coating agent, cleaning agent, paint, etc. to a material.

Still another feature of the present invention is to provide apparatuses and methods for applying a first material to a second material that allow for the filtering of impurities from the first material and thereby the reduction in defects in the application of the first material to the second material resulting from dirt and debris.

Accordingly, the present invention provides solutions to the shortcomings of prior coating methods. Those of ordinary skill in the art will readily appreciate, however, that these and other details, features and advantages will become further apparent as the following detailed description of the preferred embodiments proceeds.

BRIEF DESCRIPTION OF THE DRAWINGS

In the accompanying Figures, there are shown present preferred embodiments of the invention wherein like reference numerals are employed to designate like parts and wherein.

DETAILED DESCRIPTION OF THE PREFERRED EMBODIMENTS

Figure 1:
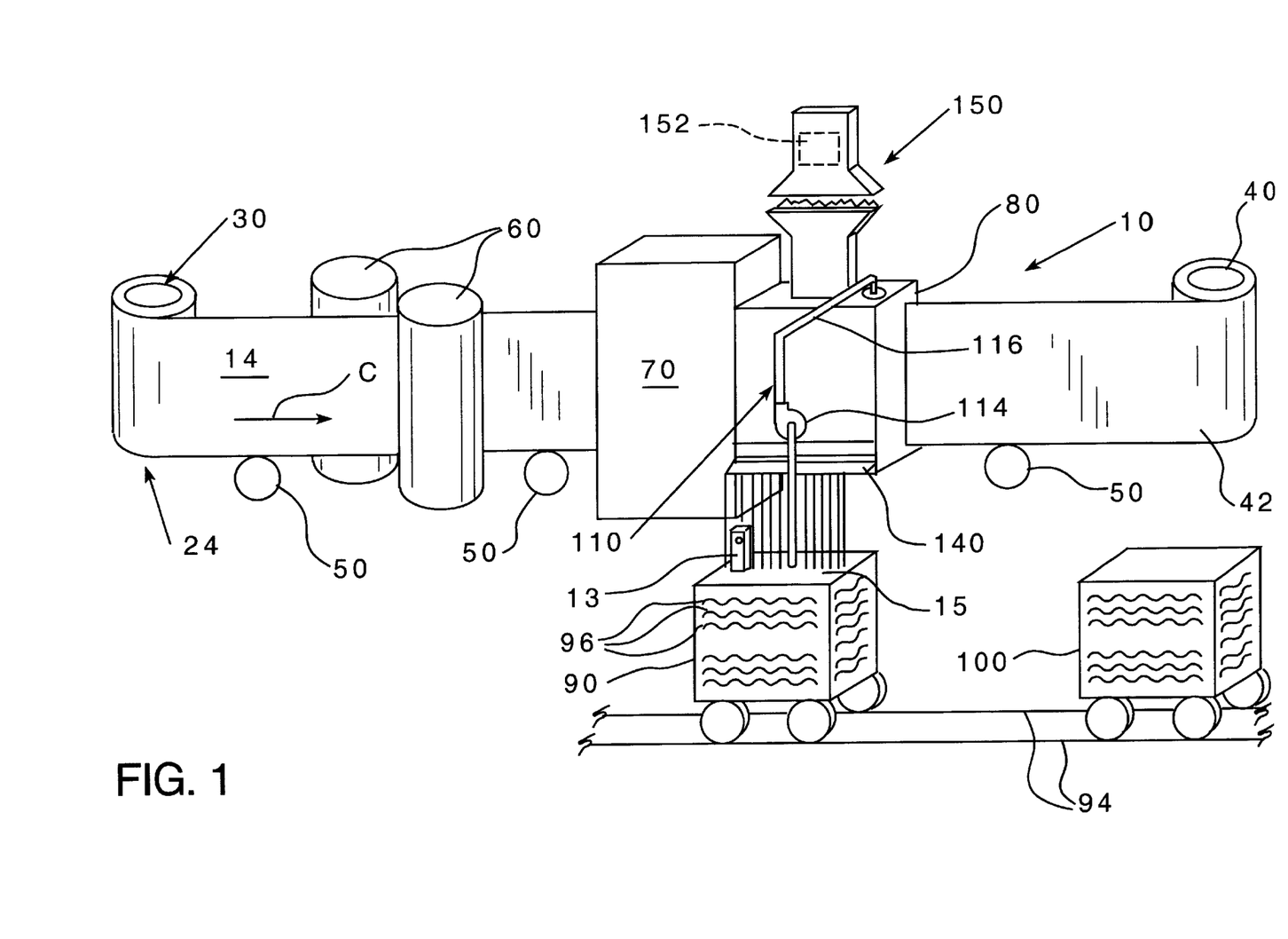
FIG. 1 is a schematic depiction of an embodiment of the coating apparatus of the present invention for applying a molten material to a heated strip of material.

Referring now to the drawings for the purposes of illustrating the present preferred embodiments of the invention only and not for the purposes of limiting the same, the Figures show a continuous "hot dip" coating line for applying a molten material to strip material such as steel. As can be seen in FIG. 1, the present invention may be used in connection with an annealing furnace for strip steel that is unwound from a coil. While the present invention is described herein for use in such hot dip processes for treating steel, the skilled artisan will readily appreciate that the subject invention may have applications that extend far beyond the steel processing industry. It will become apparent as the present Detailed Description proceeds, that the subject invention may be advantageously employed in a myriad of other coating and cleaning applications. For example, the present invention may be employed to apply paint, metallic coatings, cleaning solvents, dyes, etc. to a variety of different sheet-like materials, ranging from steel, glass, fabric, etc. Accordingly, the protection afforded to the subject invention should not be limited to hot dip coating applications for steel strip.

More particularly and with reference to FIGS. 1–4, there is shown a coating assembly 10 for applying a "first" "coating" material 12, such as molten zinc, to a "second" material such as a strip of steel 14. The strip 14 may have a first planar side 16, a second planar side 18, a first edge 20 and a second edge 22. See FIG. 3. The strip 14 may be wound in a coil 24 for storage and handling purposes. To unwind the strip 14 from the coil 24, a decoiler 30 may be employed. The construction and use of such decoilers is well known in the art and, as such, will not be discussed in great detail herein. The skilled artisan will appreciate that those decoilers manufactured by Kvaerner Metals of Pittsburgh, Pa. could, for example, be successfully used.

Figure 3:
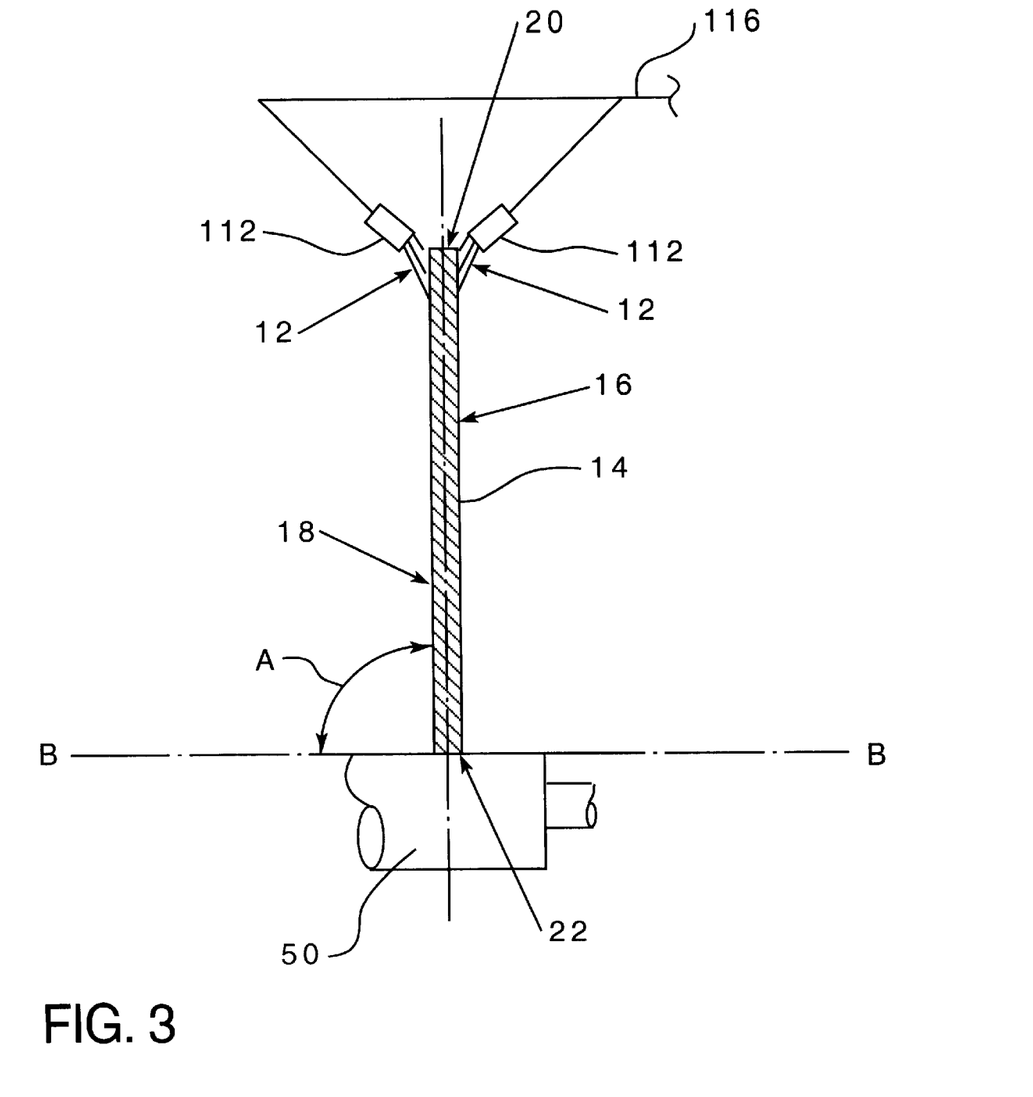
FIG. 3 is a partial cross-sectional end view of the sheet material and applicator nozzles of the present invention.

In the present invention, the strip 14 may be oriented non-horizontally on its second edge 22 as shown in FIG. 3.

Depending upon the characteristics of the "first" material employed (i.e., the viscosity, surface tension, purity, composition, etc.) the angle of "non-horizontal" orientation of the strip material 14 (represented by arrow "A" in FIG. 3) relative to a horizontal plane B—B may be advantageously adjusted to gain desired flow characteristics of the first material 12. Thus, the decoiler 30 may be advantageously oriented to orient the second material 14 in the desired non-horizontal orientation. In a one embodiment, angle "A" is 90°. However, depending upon the characteristics of the first material 12, its application rate, and the speed of the strip material 14, angle "A" may be at least 8 degrees and could be not more than 172 degrees.

Also in this embodiment, the continuous strip of second material 14 may be rewound on a commercially available coiler 40 that serves to rewind the strip material 14 into a coil 42 after the first material 12 has been applied thereto. The operation of such coiling device 40 is also well known in the art and will not be discussed herein. Those coiling devices manufactured by Kvaerner Metals of Pittsburgh, Pa., as well as other commercially available coiler apparatuses, may be employed.

Depending upon the weight and nature of the second material 14 to be treated, supporters, in the form of, for example, rollers 50 may be advantageously employed to support the second edge 22 of the second material 14 as it is driven in the non-horizontal orientation. The use of rollers 50 for supporting a variety of different materials in a horizontal orientation is well known. In the present embodiment, the rollers 50 are not driven and serve to movably support the second material 14 as it is driven in the "C" direction by drive rollers 60 that engage the planer surfaces (16, 18) of the material 14. The construction and operation of such drive rollers to drive strip materials are also known in the art. However, those drive roller arrangements manufactured by JK Manufacturing of Chicago, Ill. could be successfully employed. The reader will understand, however, that other drive apparatuses (i.e., conveyors, etc.) could be employed, or if desired, rollers 50 could be driven. In addition, depending upon the weight and nature of the second material 14, no support rollers 50 or drive rollers 60 may be required to drive the strip material 14 in a desired direction. In those instances, the strip material 14 may be driven in its non-horizontal orientation by the operation of the coiler 40 and, if necessary, the decoiler 30. Thus, the present invention may be successfully employed in other applications without the use of drive rollers 60 and/or support rollers 50.

In the embodiment depicted in FIG. 1, after the strip material 14 has been decoiled, it is driven by the drive rollers 60 through an annealing furnace 70. The construction and operation of such annealing furnace 70 to heat the material 14 to predetermined temperatures is well known. The annealing furnace manufactured by Drever of Huntingdon Valley, Pa. may be successfully employed. Other commercially available annealing furnaces may also be used.

In this embodiment, an enclosure or coating chamber 80 constructed from, for example, ceramic or graphite-coated steel is attached to the annealing furnace 70 such that the strip material 14 enters the coating chamber 80 after it exits the furnace 70. The coating chamber 80 communicates with a source of coating material that may preferably comprise a reservoir 90. However, one of ordinary skill in the art will appreciate that the need for such an enclosure 80 is dependent upon the strip material 14 and coating material 12 being processed and that such an enclosure 80 need not be included in certain other embodiments of the present invention. In this embodiment, the reservoir 90 comprises a resistance heated container fabricated from, for example, AJAX Magnathermic Corp. of Warren, Ohio, and containing a plurality of appropriately sized resistance heaters 96 to cause the coating material 12 to be heated to a desired temperature. In this embodiment, the reservoir 90 is movably mounted relative to the coating chamber 80. As can be seen in FIG. 1, the reservoir 90 is mounted on wheels 92 that are adapted to travel on a trackway 94. Such arrangement enables the reservoir 90 to be relatively quickly moved away from the coating chamber 80 to enable another reservoir 100 mounted on the trackway 94 to be moved into position. In the embodiment depicted in FIG. 1, zinc ingots 13 are added to the reservoir 90 and heated to a desired temperature of approximately 450 degrees Celsius, which causes the zinc 12 to become flowable and capable of being pumped and dispersed onto the strip material 14. Another coating material such as, for example, aluminum at a temperature of approximately 685 degrees Celsius may be provided in the second reservoir 100.

Also in this embodiment, a pump assembly 110 is employed to pump the first material 12 into at least one or more nozzles 112 located within the coating chamber 80. The pump assembly 110 may comprise a commercially available pump 114 that is compatible with the type of coating material 12 employed and includes a transfer conduit 116 for transferring the coating material 12 through the nozzle(s) 112. The pump 114 may comprise an electromagnetic pump such as those manufactured by Metaullics of Solon, Ohio. However other pumping arrangements could be successfully employed. For example, it will be appreciated that at least one filter 117 may be introduced into the transfer conduit 116 to remove impurities from the first material 12 before it reaches the nozzles 112. See FIG. 5.

The nozzles 112 may be located adjacent the first edge 20 of the second material 14 as it passes through the coating chamber 80. The nozzles 112 may be oriented to apply the first material 12 to both sides (16, 18) of the second material 14 as it passes through the coating chamber 80. In the alternative, the nozzles 112 maybe oriented within the coating chamber 80 to apply the first material 12 only to one of the sides (16, 18) of the strip material 14. The number and construction of commercially available nozzles 112 employed may be dependent upon the various characteristics of the first material (such as, for example, flow rate, pressure, viscosity and temperature). In the present embodiment, and by way of example only, those nozzles manufactured by Fontaine Engineering, Inc. of West Virginia may be employed for applying zinc at a temperature of approximately 450 degrees Celsius, a flow rate of approximately 0.06 cubic meters per minute and a viscosity of approximately 34 centipoise when the strip material 14 is moving in the "C" direction at a speed of approximately 100 meters per minute. In other applications, depending upon the various characteristics of the first material 12 and the speed of the strip material 14, the coating material 12 may be applied through apertures provided in the transfer conduit 116 and essentially dripped onto the strip material 14 as it passes thereby.

Those of ordinary skill in the art will appreciate that the non-horizontal orientation of the strip material 14 enables the first material 12 to migrate from the first edge 20 of the strip material 14 to the second edge 22 of the second material 14 at least partially under the influence of gravity. In this embodiment, to assist in the dispersion of the coating material 12 onto the strip material 14 and, if desired, to achieve a relatively uniform thickness of the coating material 12 remaining on the strip material 14, a disperser 120 is employed. In this embodiment, the disperser 120 comprises at least one, and preferably 2, gas wiping knives 121 that are oriented in close proximity to a corresponding side of the strip material 14. In those applications wherein the coating material 12 is applied to only one side of the strip material 14, the gas wiping knives 121 may only be required for use in connection with the coated side. The construction and operation of gas wiping knives 121 is generally known. Such device, generally comprises an enclosure 122 that at least extends the width of the material to be wiped (e.g., material 14). The enclosure 122 communicates with a source of fluid material such as air 130 that is admitted into the enclosure 122 at a desired pressure and flow by a motivator 140. The motivator 140 may comprise a commercially available air blower which may supply air 130 at a rate of approximately 50 cubic meters per minute and pressure of approximately 35 KPa. However, other motivators may be successfully employed. For example, the gas may comprise an inert gas such as, for example, nitrogen that is supplied in pressurized bottles or piped in. The pressurized bottles or pipes may be attached to the gas wiping knives 121 in such a manner that the gas is supplied thereto at a desired rate and pressure. Those of ordinary skill in the art will appreciate that other known non-contact wiping technology may also be employed.

In a preferred embodiment, the gas wiping knives 121 each have an elongated slot 126 that extends substantially the length of their respective enclosures 122 for admitting a curtain of gas therefrom. The gas wiping knives 121 are then adjusted relative to the strip material 14 such that the air 130 contacts the coating material 12 migrating across the strip material 14 to disperse the coating material 12 thereon such that after the strip material 14 passes by the gas wiping knives 121 (i.e., the strip material 14 is no longer contacted by the gas stream 130 emitted thereby), the coating material 12 remaining on the strip material 14 has been substantially dispersed on the strip material 14 to a substantially uniform thickness. As the coating material 12 is dispersed on the strip material 14, excess coating material 15 is received in a collection spout 140 affixed to the bottom of the coating chamber 80 and directs such excess coating material 15 back into the reservoir 90 wherein it is available to be treated and again be pumped onto the strip material 14.

In one embodiment, at least some of those vapors and fumes generated by the first material 12 as it is applied to the second material 14 are exhausted through a conventional exhaust assembly 150 attached to the coating chamber 80. If desired, combustible vapors may be combusted in a known manner within the exhaust assembly 150 by a conventional burner arrangement generally designated as 152. See FIG. 1. The exhaust assembly manufactured by Drever of Huntingdon Valley, Pa. may be employed. Of course other exhaust arrangements compatible with the types of materials employed may be used. Those of ordinary skill in the art will appreciate that some furnace gas may also exit through the exhaust with the vapors of the coating material 12.

Figure 2:
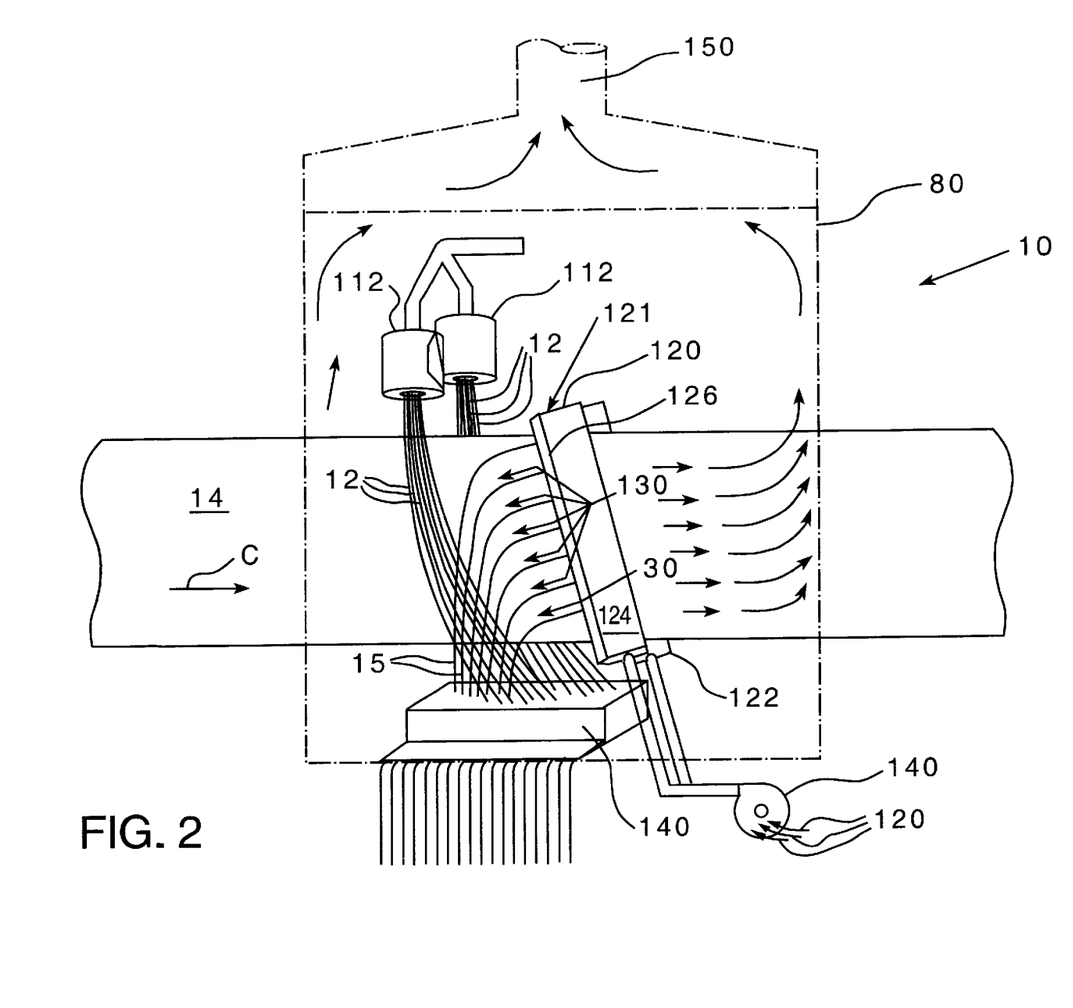
FIG. 2 is a schematic view of the coating chamber of the coating apparatus of FIG. 1.

The operation of the embodiment depicted in FIGS. 1–3 will now be discussed. In this embodiment, the coil 24 of steel strip 14 is loaded onto the decoiler 30 which is oriented at a predetermined angle relative to the horizontal plane B—B (preferably angle "A" is 90°). Thereafter, the strip 14 is fed into the drive assembly rollers 60 which serves to drive the strip 14 into the annealing furnace 70 at a speed of, for example, 100 meters per minute. As the strip 14 passes through the annealing furnace 70, it is heated to approximately 750 degrees Celsius. After the strip 14 exits the annealing furnace 70, it enters the coating chamber 80 wherein molten zinc 12 at a temperature of, for example, 450 degrees Celsius is sprayed onto the strip 14 adjacent the first edge 20 thereof. Prior to commencing the process, zinc ingots 13 were added to the heated reservoir 90 which was moved into position on the trackway 94. After the reservoir 90 was moved into position on the trackway 94, the pump assembly 110 was oriented relative to the reservoir such that the molten zinc 12 therein could be pumped into the coating chamber 80 and onto the strip 14 passing therethrough. The pumping assembly 110 pumps the zinc 14 at a flow rate of for example, 0.06 cubic meters per minute and at a pressure of 98 KPa. As the molten zinc 12 is applied to the strip 14, the gas wiping knives 121, arranged relative to the strip material 14, blow air 130 thereon at a flow rate of, for example, 50 cubic meters per minute and at a pressure of 35 KPa such that the zinc material 12 that remains on the strip 14 after it is no longer contacted by the air 130 from the gas wiping knives 121 is substantially uniformly deposited on the strip material 14 at a thickness of, for example, 10 $\mu$m. The coating thickness can be adjusted or homogenized using known wiping technology. If it is desired to thereafter apply another coating or material to the same strip material 14 or to another strip material, the first reservoir 90 is moved out of position and a second reservoir 100 is moved to the position wherein it can communicate with the pumping assembly 110. If appropriate, the first material 12 may be cleaned from the pumping assembly 110 or the pumping assembly 110 may be quickly replaced with another clean pumping assembly to reduce the amount of downtime associated with changing coating material and to avoid contaminating the new coating material with that prior coating material remaining in the pumping assembly.

Figure 4:
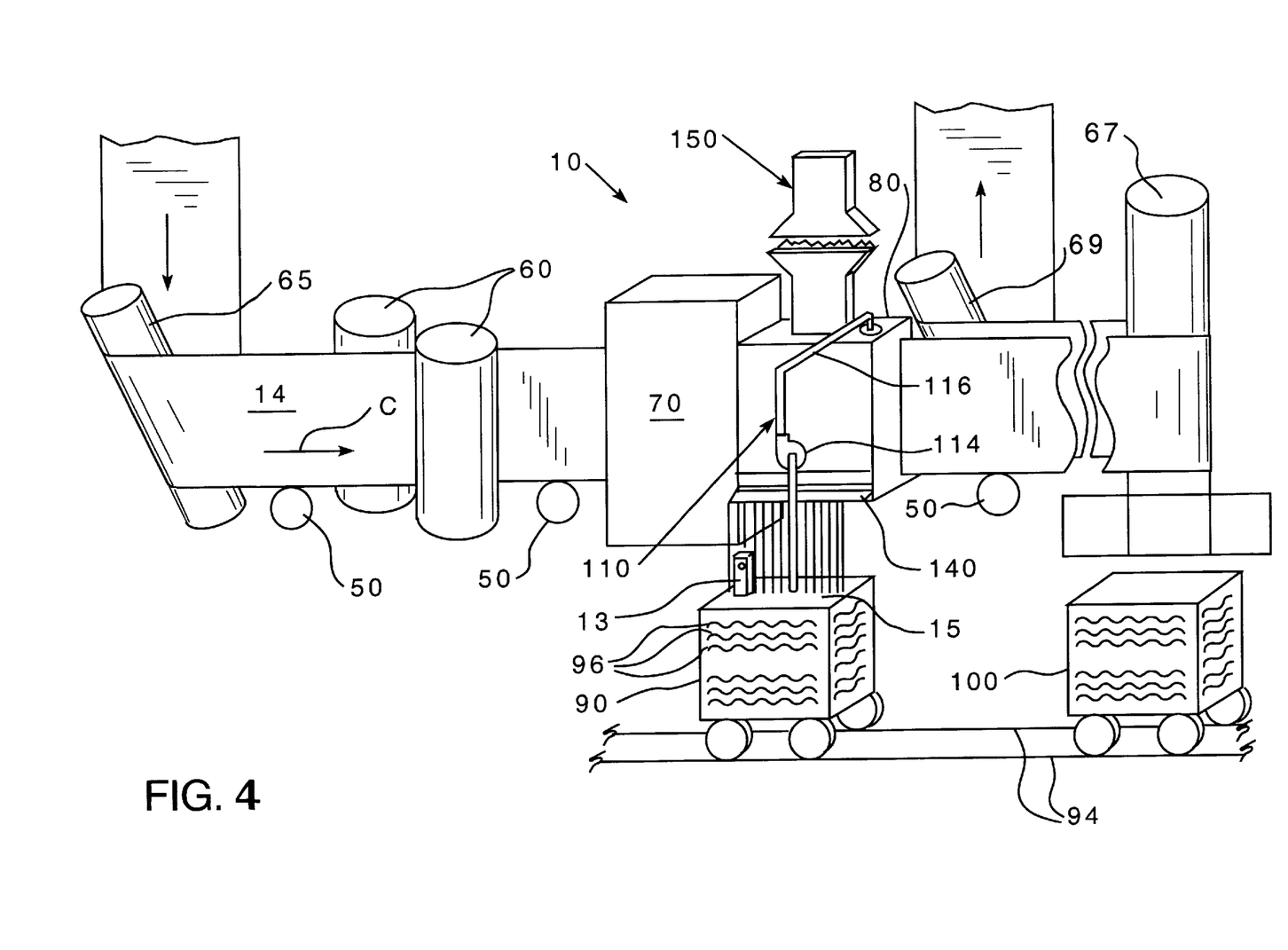
FIG. 4 is a schematic depiction of an embodiment of the coating apparatus of the present invention for applying a molten material to a heated strip of material in a continuous coating line.

It will be appreciated that the above-described embodiment of the present invention may also be employed in conjunction with a continuous coating line. The design and operation of a continuous coating line is well known in the art, and, as such, will not be discussed in great detail herein. FIG. 4 depicts the present invention modifying an existing continuous coating line. In the embodiment depicted in FIG. 4, the steel strip 14 passes through a first angled roll 65 as it approaches the coating assembly 10. The first angled roll 65 is oriented at a predetermined angle relative to the horizontal plane B—B and serves to place the strip 14 in a substantially non-horizontal orientation before it enters the coating assembly 10. Thereafter, the strip 14 is fed into the drive assembly rollers 60 and through the annealing furnace 70 and coating chamber 80, as described above with regard to FIGS. 1–3. After exiting the coating assembly 10, the strip 14 is passed through an intermediate roller 67 to a second angled roll 69. The second angled roll 69 is oriented at a predetermined angle relative to the horizontal plane B—B and serves to return the strip 14 to a substantially horizontal orientation. While the embodiment of the present invention depicted in FIG. 4 shows the strip 14 approaching from and exiting to a position above the assembly 10, it will be appreciated that the present invention will accommodate the approach and exit of the strip 14 from either above or below the coating assembly 10. It will further be appreciated that the annealing furnace 70 may alternatively be positioned downstream from the first angled roll 65, such that the strip 14 passes through the annealing furnace 70 prior to passing through the first angled roll 65.

Figure 5:
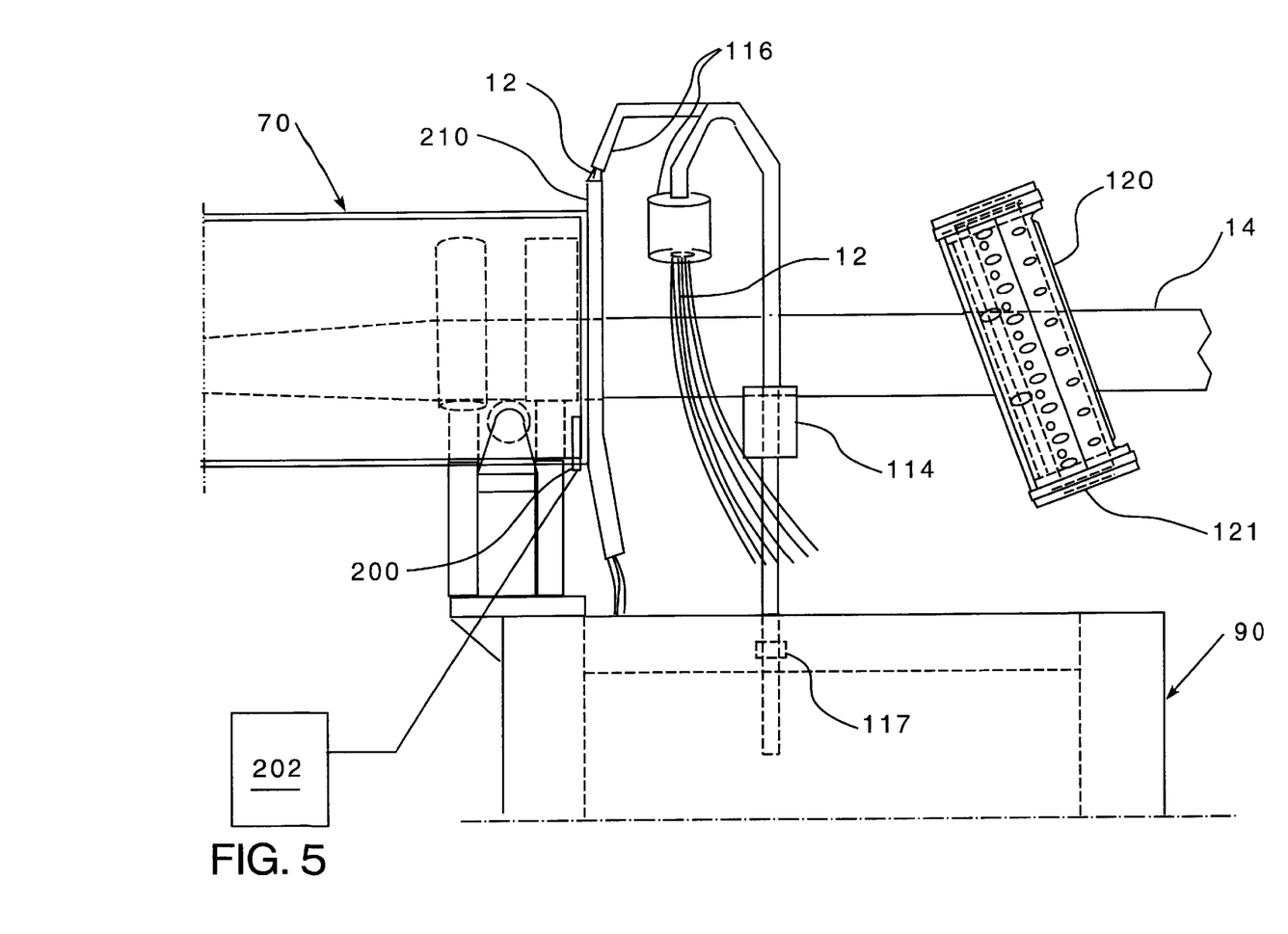
FIG. 5 is a partial side elevational schematic depiction of another embodiment of the coating apparatus of the present invention.

In another embodiment of the present invention, a nitrogen purge may be employed at the exit end of the furnace 70 for "sealing" or rendering the strip 14 substantially oxide free before it is contacted with the first material (coating liquid) 12. The nitrogen forms a boundary layer or curtain of nitrogen that prevents the strip from oxidizing. The reader will appreciate that oxidation of the strip at this stage could harm the adherence and quality of the coating on the strip. As can be seen in FIG. 5, the nitrogen purge may comprise one or more discharge nozzles 200 that are oriented for discharge into the furnace 70 adjacent the exit end thereof and that are attached to a source of nitrogen gas 202.

Figure 6:
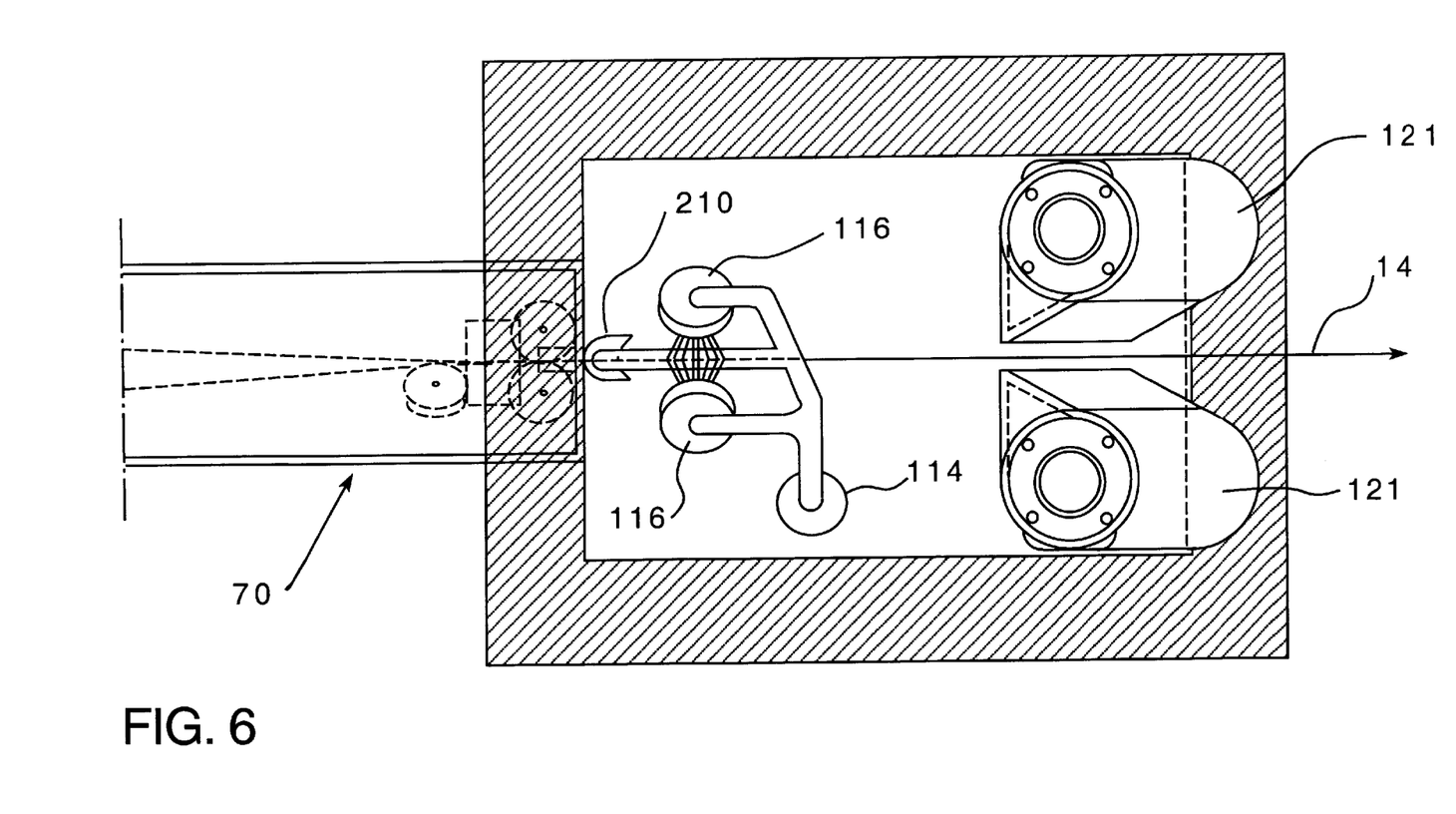
FIG. 6 is a partial plan view of the coating apparatus depicted in FIG. 5.
Figure 7:
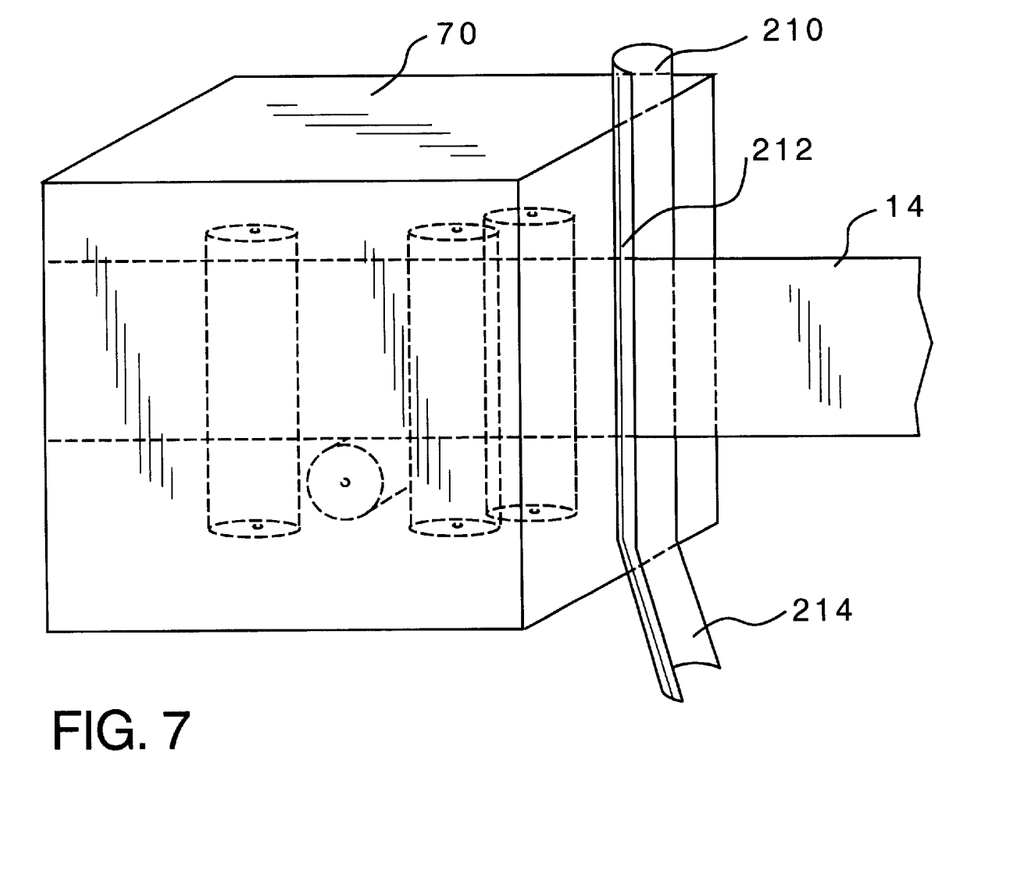
FIG. 7 is a partial perspective view of a furnace and chute of the present invention.
Figure 8:
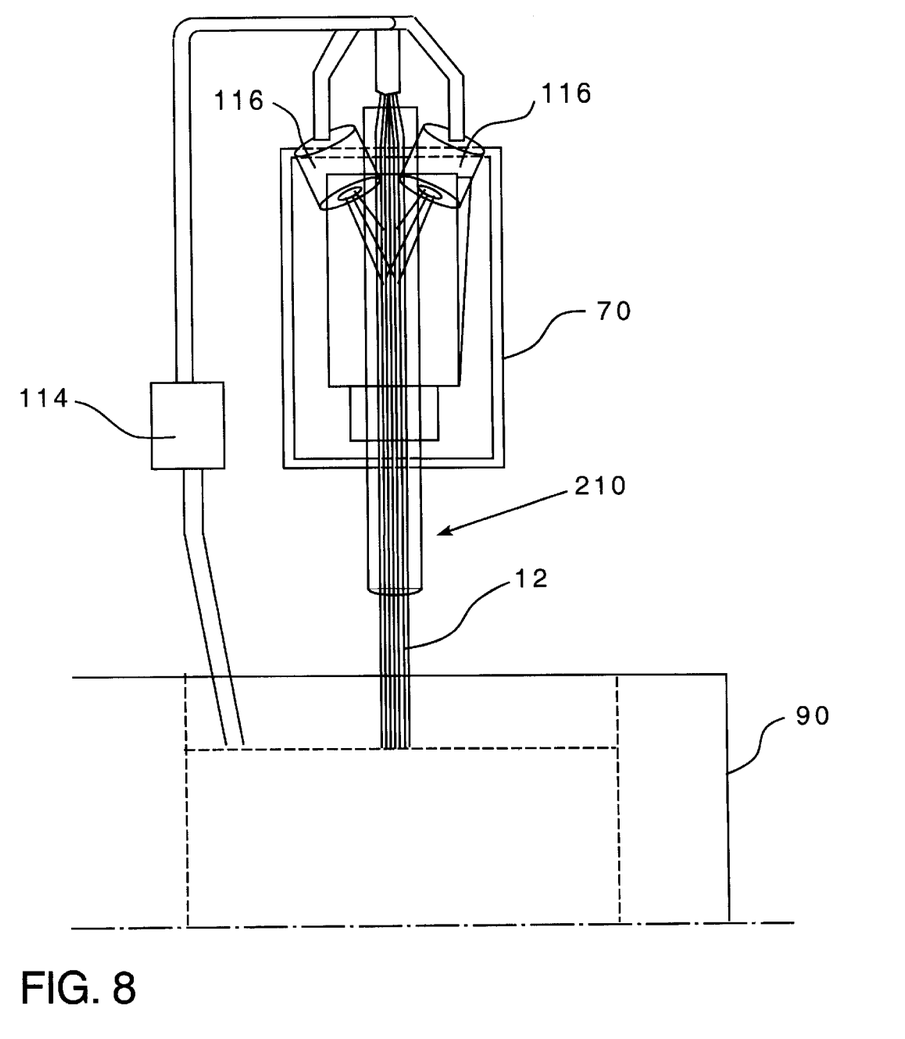
FIG. 8 is an end elevational view of the coating apparatus depicted in FIGS. 5 and 6.

To further enhance the ability to render the strip material 14 in an oxide free state immediately prior to coating, an additional sealing arrangement may be employed. As can be seen in FIGS. 5 and 6, the liquid coating 12 can be poured from the pump spout 116 down the exit opening of the furnace 70, via a channel or chute 2 that has a graphite liner 212 thereon. In one embodiment, the chute 2 has an arcuate cross-sectional shape and is fabricated from steel, stainless steel, ceramic, etc. The chute 210 has an exit opening 212 therein through which the strip 14 exits the furnace 70. In addition, the chute 210 may have a graphite liner 214 thereon that is formed from a graphite foil and that is attached to the chute by conventional techniques or by coating the chute 210 with graphite utilizing conventional coating techniques. See FIG. 7. The person of ordinary skill in the art will appreciate that the coating material 12 will not penetrate the furnace 70 because: (1) the nitrogen purge acts as a barrier to the coating and prevents it from entering the furnace and (2) the surface tension of the liquid coating 12 on the graphite liner 212 along with the strip movement would not allow the coating 12 to penetrate the furnace. The coating nozzle(s) 116 can be oriented adjacent to the chute 210 to avoid spillage or waste of the coating material 12. The coating process would otherwise operate in the manner described above. In some applications, a single coating nozzle 116 discharging coating material 12 down the chute 210 may be sufficient to coat the sheet material 14 with a single coating of coating material 12. However, if additional exposure or coating treatments are necessary for the specific application, the may be handled with multiple coating nozzles 116, of appropriate geometry as shown in FIGS. 5, 6, and 8.

Those of ordinary skill in the art will appreciate that the above-described example and parameters may be modified to suit the particular types of coating material and strip material employed without departing from the spirit and scope of the present invention. It will be further appreciated that the present invention represents a vast improvement over prior hot dip coating processes for steel strip. Such prior hot dip arrangements supported the strip in a horizontal orientation which made it more susceptible to collecting flux, dross, dirt, debris, etc. in the coating on the strip. It also made it difficult to effectively remove such flux, dross, dirt, debris, etc. from the strip. Moreover, such prior processes required the use of large molten coating pots to assure minimal coating quality degradation because of such inefficient coating arrangements. Due to the size of such molten coating pots, rapid change of coating material was improbable due to the requirement of moving cumbersome structures which housed movable pot equipment and which often lead to the introduction of flux, dross, dirt, debris, etc. to the coating process. The size of such pots often required the use of additional molten material which must be superfluously heated.

The present invention solves those problems by eliminating the build up of flux, dross, dirt, debris, etc. on the strip material. By utilizing gravity, dirt and debris can be effectively blown off of the strip by the coating material on the non-horizontally oriented strip material. In addition, the coating material may be filtered to remove flux, dross, dirt, debris, etc. from the coating material before it is even applied to the strip. Thus, a more efficient and effective coating is achieved by the present invention, by substantially reducing the removal resistance of excess coating material applied to the strip. In addition, smaller reservoirs may be employed which can quickly be moved into and out of position, greatly reducing the amount of downtime experienced between coating changes. Also such smaller reservoirs of the present invention require less energy to be expended in heating the coating materials.

While the present invention has been herein described for applying a coating material to strip steel as it exits an annealing furnace, the skilled artisan will appreciate that the present invention could be successfully employed in a variety of other applications. For example, the first material could comprise a cleaning solvent, a paint, a powder coating material, a dye, molten terne, tin plate, molten zinc, molten aluminum, a combination of molten zinc and aluminum, etc. Thus, the term "coating" as used herein should not be narrowly construed as encompassing only those coating materials used in connection with steel strip. Moreover, the second "strip" material may comprise a myriad of other materials such as plate glass, fabric materials (i.e., cloth), polymeric materials, metals (i.e., aluminum plate, still plate), paper, etc. It will be appreciated that the concepts of the present invention may be easily and successfully adapted for use in connection with such materials. It will be further appreciated that the material to be coated, cleaned, painted, etc., need not be a continuous strip material. That is, such material may consist of discreet segments that are supported in a non-horizontal orientation by support arrangement, such as, for example, conveyor belts rollers, etc. In addition, it will be appreciated that the present invention may be adapted to accommodate the processing of multiple strips of material or wire in parallel. Accordingly, those of ordinary skill in the art will appreciate that various changes in the details, materials and arrangement of parts which have been herein described and illustrated in order to explain the nature of the invention may be made by the skilled artisan within the principle and scope of the invention as expressed in the appended claims.

What is claimed is:

1. A method for applying a first material to a second material having at least two edges, said method comprising:
   supporting the second material on one edge thereof in a non-horizontal orientation;
   applying the first material to the second material adjacent another edge of the second material; and
   applying a pressurized gas to the first material to substantially uniformly disperse the first material on the second material such that the first material remaining on the second material has a substantially uniform thickness.

2. The method of claim 1 further comprising collecting excess first material after it has migrated across the second material.

3. The method of claim 2 comprising reapplying the excess first material to the second material.

4. The method of claim 1 further comprising exhausting vapors resulting from the application of the first material to the second material.

5. The method of claim 4 further comprising combusting at least some of said exhausted vapors.

6. The method of claim 1 comprising heating the first material prior to applying the second material thereto.

7. Apparatus for applying a liquid coating material to a moving sheet material having a first edge and a second edge, and at least one planar surface, said apparatus comprising:

at least one support member, said support member contacting at least a portion of the first edge surface of the moving sheet material and supporting the moving sheet material in a non-horizontal orientation;

at least one coating applicator, said at least one coating applicator applying the coating material adjacent at least a portion of the second edge of the moving sheet material; and at least one gas wiping member oriented adjacent the sheet material to disperse the coating material on the sheet material such that the coating material remaining on the sheet material has a substantially uniform thickness.

8. The apparatus of claim 7 further comprising at least one driver, wherein said at least one driver drives the sheet material in a predetermined direction while in said non-horizontal orientation.

9. The apparatus of claim 7 wherein at least one said gas wiping member disperses a pressurized gas onto the sheet material.

10. The apparatus of claim 7 wherein at least one said coating applicator comprises:

a reservoir containing said coating material; and a pump connected to said reservoir for pumping the coating material from said reservoir onto the sheet material adjacent to the second edge thereof.

11. The apparatus of claim 10 wherein said reservoir is oriented relative to said sheet material to receive excess coating material exiting the sheet material after application of the coating material to the sheet material.

12. The apparatus of claim 10 wherein said reservoir comprises a heated container.

13. The apparatus of claim 10 wherein said reservoir is movably received on tracks.

14. The apparatus of claim 7 further comprising an exhaust assembly oriented adjacent said applicator.

15. The apparatus of claim 14 wherein said exhaust assembly has a burner for burning at least some exhaust fumes passing therethrough.

16. The apparatus of claim 7 wherein said sheet material is oriented on a first plane that is substantially perpendicular to a second substantially horizontal plane.

17. The apparatus of claim 7 wherein said sheet material is oriented along a first plane that intersects a substantially horizontal second plane at a predetermined angle.

18. The apparatus of claim 17 wherein said predetermined angle is at least greater than 8° and not more than 172°.

19. The apparatus of claim 7 wherein at least one said supporter comprises a roller configured to engage at least a portion of the first edge of the sheet material.

20. The apparatus of claim 7 wherein the sheet material comprises coiled strip material and wherein said apparatus further comprises:

a decoiler for supporting and decoiling the coiled strip material therefrom; and a coiler for recoiling the strip material after the coating material has been applied thereto.

21. The apparatus of claim 7 wherein the liquid coating material is selected from the group consisting of molten terne, tin plate, paint, molten zinc, molten aluminum, powder coating material and a combination of molten zinc and molten aluminum.

22. The apparatus of claim 7 wherein the sheet material comprises a material selected from the group consisting of steel plate, plate glass, aluminum plate, paper, and cloth.

23. The apparatus of claim 7 wherein the sheet material has a first planar surface and a second planar surface and wherein the coating material is applied to the first and second planar surfaces of the strip material.

24. The apparatus of claim 23 wherein said support members do not contact the first and second planar surfaces of the sheet material.

* * * * *